US012609506B2

(12) United States Patent
Yamamoto

(10) Patent No.: US 12,609,506 B2
(45) Date of Patent: Apr. 21, 2026

(54) CONTROL DEVICE, CONTROL METHOD, AND FIBER LASER DEVICE

(71) Applicant: FUJIKURA LTD., Tokyo (JP)

(72) Inventor: Tatsuya Yamamoto, Chiba (JP)

(73) Assignee: Fujikura Ltd., Tokyo (JP)

( * ) Notice: Subject to any disclaimer, the term of this patent is extended or adjusted under 35 U.S.C. 154(b) by 637 days.

(21) Appl. No.: 18/147,678

(22) Filed: Dec. 28, 2022

(65) Prior Publication Data

US 2023/0268715 A1 Aug. 24, 2023

(30) Foreign Application Priority Data

Feb. 21, 2022 (JP) ................................. 2022-025022

(51) Int. Cl.
*H01S 3/091* (2006.01)
*H01S 3/094* (2006.01)
*H01S 3/0941* (2006.01)
*H01S 3/102* (2006.01)

(52) U.S. Cl.
CPC ...... *H01S 3/0912* (2013.01); *H01S 3/094003* (2013.01); *H01S 3/09408* (2013.01); *H01S 3/0941* (2013.01); *H01S 3/1022* (2013.01)

(58) Field of Classification Search
CPC ............... H01S 3/0912; H01S 3/09408; H01S 3/094003; H01S 3/0941; H01S 3/1022
See application file for complete search history.

(56) References Cited

U.S. PATENT DOCUMENTS

| | | | |
|---|---|---|---|
| 2002/0075561 A1 | 6/2002 | Krummrich | |
| 2006/0002270 A1* | 1/2006 | Shimizu | H04N 1/40031 |
| | | | 369/116 |
| 2012/0269217 A1* | 10/2012 | Senda | B23K 26/0613 |
| | | | 372/38.02 |
| 2015/0229095 A1* | 8/2015 | Miyato | H01S 3/08009 |
| | | | 372/6 |
| 2016/0308328 A1* | 10/2016 | Sakamoto | H01S 5/0687 |
| 2017/0125976 A1* | 5/2017 | Sato | H01S 5/042 |
| 2018/0138654 A1* | 5/2018 | Chiba | B23K 26/0626 |

FOREIGN PATENT DOCUMENTS

| | | |
|---|---|---|
| CN | 103368046 A | 10/2013 |
| CN | 203849172 U | 9/2014 |
| JP | 2004337970 A | 12/2004 |
| JP | 2013197371 A | 9/2013 |
| JP | 2015126036 A | 7/2015 |
| JP | 2017084964 A | 5/2017 |
| JP | 2021-034530 A | 3/2021 |
| WO | 2012073952 A1 | 6/2012 |

* cited by examiner

*Primary Examiner* — James A Menefee
(74) *Attorney, Agent, or Firm* — Osha Bergman Watanabe & Burton LLP

(57) ABSTRACT

A control device for controlling two or more laser diode (LD) modules each supplying pumping light to a variable-output fiber laser, includes: a controller that sets, in accordance with a set value of laser output power of the variable-output fiber laser, a number of LD modules to which a driving current is supplied among the two or more LD modules.

7 Claims, 2 Drawing Sheets

CONTROL DEVICE, CONTROL METHOD, AND FIBER LASER DEVICE

This Nonprovisional application claims priority under 35 U.S.C. § 119 on Patent Application No. 2022-025022 filed in Japan on Feb. 21, 2022, the entire contents of which are hereby incorporated by reference.

TECHNICAL FIELD

The present invention relates to a control device and a control method for controlling at least two laser diode (LD) modules each supplying pumping light to a variable-output fiber laser. The present invention also relates to a fiber laser device including the control device.

BACKGROUND

In the field of laser processing, fiber lasers have been widely used. In such a fiber laser, a rare earth element such as Yb, which is a dopant of an optical fiber, is pumped by using a laser beam (hereinafter, referred to as "pumping light") outputted from an LD module. The fiber laser thus achieves laser beam recursive amplification.

In order to efficiently use the pumping light outputted from the LD module, a narrow-bandwidth oscillation wavelength may be employed. This is because in a case in which the LD module has a broad-bandwidth oscillation wavelength, pumping light which cannot be absorbed into the rare earth element (pumping light outside the absorption spectrum of the rare earth element) increases. This results in a decrease in use efficiency of the pumping light.

Patent Literature 1 discloses a laser module that serves as an example of an LD module for which an attempt is made to have a narrower bandwidth. In the laser module disclosed in Patent Literature 1, a wavelength stabilizing element is used to achieve a narrower bandwidth of the oscillation wavelength.

PATENT LITERATURE

Patent Literature 1

Japanese Patent Application Publication, Tokukai, No. 2021-34530

In a variable-output fiber laser, it is necessary to vary the power of pumping light in accordance with the power of output laser beam (hereinafter, also referred to as "laser output power"). For example, in order to decrease the laser output power, it is necessary to decrease the power of the pumping light. Further, in order to decrease the power of the pumping light, it is necessary to decrease a driving current to be supplied to an LD module. In particular, in a case in which a pumping light source is constituted by at least two LD modules, it is necessary to further decrease the driving current to be supplied to each of the LD modules.

Thus, in a variable-output fiber laser, in particular, in a fiber laser including a pumping light source constituted by at least two LD modules, the amount of a driving current supplied to each of the LD modules greatly varies. This causes a great shift in oscillation wavelength of the LD modules, and consequently leads to deterioration in use efficiency of pumping light.

It should be noted that use of the technique disclosed in Patent Literature 1 can make such deterioration unlikely to occur. However, use of the technique disclosed in Patent Literature 1 increases manufacturing cost due to addition of a wavelength stabilizing element, and also decreases yields due to additional positioning and thermal expansion management of the wavelength stabilizing element.

SUMMARY

One or more embodiments of the present invention achieve, by use of an alternative method to a method in which a wavelength stabilizing element is used, a technique for reducing an amount of shift that occurs in oscillation wavelength of an LD module due to a change in laser output power.

A control device in accordance with one or more embodiments of the present invention is a control device for controlling at least two laser diode (LD) modules each supplying pumping light to a variable-output fiber laser, the control device including a control section ("controller") configured to set, in accordance with a set value of laser output power of the fiber laser, the number of LD modules to be supplied with a driving current among the at least two LD modules.

A control method in accordance with one or more embodiments of the present invention is a control method for controlling at least two laser diode (LD) modules each supplying pumping light to a variable-output fiber laser, the method including a controlling step in which the number of LD modules to be supplied with a driving current among the at least two LD modules is set in accordance with a set value of output power of the fiber laser.

A fiber laser device in accordance with one or more embodiments of the present invention includes the control device having the configuration described above.

According to one or more embodiments of the present invention, it is possible to achieve, by use of an alternative method to a method in which a wavelength stabilizing element is used, a technique for reducing an amount of shift that occurs in oscillation wavelength of each LD module due to a change in laser output power.

DETAILED DESCRIPTION (Configuration of Control Device)

Figure 1:
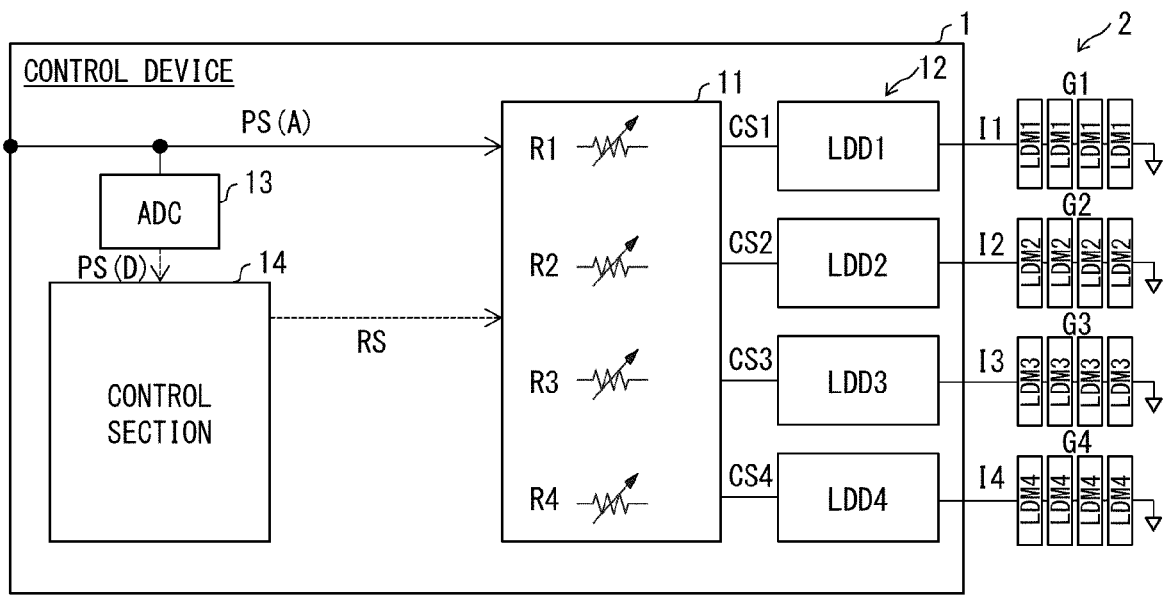
FIG. 1 is a block diagram illustrating a configuration of a control device in accordance with one or more embodiments of the present invention.

The following description will discuss a configuration of a control device 1 in accordance with one or more embodiments of the present invention, with reference to FIG. 1. FIG. 1 is a block diagram illustrating a configuration of the control device 1. In FIG. 1, paths for analog signals are indicated by solid lines, and paths for digital signals are indicated by broken lines.

The control device 1 is a device for controlling an LD module group 2 that supplies pumping light to a variable-output fiber laser. The LD module group 2 is a set of n LD module groups G1 to Gn, and each LD module group Gi is a set of m LD modules LDMi. Here, n is any natural number of 2 or more, m is any natural number of 1 or more, and i is a natural number of 1 or more and n or less. FIG. 1 illustrates, as an example, a configuration in which both n and m are 4.

The control device 1 includes a digital potentiometer 11, an LD driver group 12, an AD (analog-to-digital) converter 13, and a control section 14. The LD driver group 12 is a set of n LD drivers LDD1 to LDDn.

To the control device 1, an output setting signal PS(A) is inputted. The output setting signal PS(A) is an analog signal that indicates a set value of laser output power of the fiber laser. The output setting signal PS(A) is supplied to the digital potentiometer 11 and the AD converter 13.

The digital potentiometer 11 includes n variable resistors R1 to Rn which are for converting the output setting signal PS(A) to current setting signals CS1 to CSn. Here, each current setting signal CSi is an analog signal that specifies a value of a driving current Ii to be supplied to an LD module LDMi. Each current setting signal CSi is supplied to an LD driver LDDi. The digital potentiometer 11 sets a resistance value of each of the variable resistors R1 to Rn, in accordance with a resistance setting signal RS obtained from the control section 14 (described later). The resistance setting signal RS is a digital signal that specifies the resistance value of each of the variable resistors R1 to Rn.

Each LD driver LDDi constituting the LD driver group 12 sets the value of the driving current Ii to be supplied to the LD module LDMi, in accordance with the current setting signal CSi obtained from the digital potentiometer 11. It is possible to use, for example, a constant-current circuit as each LD driver LDDi. Each LD module LDMi constituting the LD module group 2 outputs a laser beam in accordance with the driving current Ii supplied from a corresponding LD driver LDDi. Such laser beams outputted from n×m LD modules LDM1 to LDMn are supplied to the fiber laser as pumping light.

The AD converter 13 is configured to convert the output setting signal PS(A), which is an analog signal, to an output setting signal PS(D), which is a digital signal. The output setting signal PS(D) is supplied to the control section 14. The control section 14 generates a resistance setting signal RS to be supplied to the digital potentiometer 11, on the basis of the output setting signal PS(D) obtained from the AD converter 13. In order to generate the resistance setting signal RS, the control section 14 performs the following processes.

That is, the control section 14 specifies a set value of laser output power of the fiber laser, with reference to the output setting signal PS(D) obtained from the AD converter 13 (Process 1). Further, in accordance with the set value specified in Process 1, the control section 14 decides the number of LD modules to be supplied with the driving current among the LD modules LDM1 to LDMn (Process 2). In this process, the control section 14 decides the number of LD modules to be supplied with the driving current such that in a case in which the set value specified in Process 1 is lower, the number is smaller. Further, the control section 14 selects, from the LD module group 2, an LD module or modules of the number decided in Process 2 (Process 3). Furthermore, the control section 14 decides a resistance value for each of the variable resistors R1 to Rn, in accordance with the set value specified in Process 1 and the number decided in Process 2 (Process 4). The resistance value of a variable resistor corresponding to an LD module which has not been selected in Process 3 is set to a maximum resistance value of the variable resistor. As a result, the LD module or modules which have not been selected in Process 3 are supplied with substantially no driving current, and only the LD module or modules selected in Process 3 are supplied with the driving current. Further, the control section 14 generates a resistance setting signal RS that indicates the resistance value which has been decided for each of the variable resistors R1 to Rn in Process 4 (Process 5).

It should be noted that, in one or more embodiments, the n×m LD modules LDM1 to LDMn are bundled into n LD module groups G1 to Gn, and the driving currents I1 to In are each set for a corresponding LD module group Gi. Thus, in the abovementioned Process 2, decided is the number of LD module groups to be supplied with the driving current among the LD module groups G1 to Gn. Further, in the abovementioned Process 3, the LD module group or groups of the number decided in Process 2 are selected from the LD module groups G1 to Gn.

Effects of Control Device

The control device 1 decides, in accordance with the set value of laser output power of the fiber laser, the number of LD modules to be supplied with the driving current among the LD modules LDM1 to LDMn. Accordingly, the number of the LD modules to be supplied with the driving current can be smaller in a case in which the set value is lower. This consequently allows a greater driving current to be supplied to each of the LD modules that have been selected, as compared to a case in which the driving current is to be supplied to all of the LD modules LDM1 to LDMn. Thus, it is possible to reduce an amount of shift that occurs in oscillation wavelength due to a too small amount of the driving current supplied to each of the LD modules.

The following description will describe these advantageous effects on the basis of a specific example. The following assumes that the number n of the LD module groups G1 to Gn is 4, and that the number m of the LD modules LDMi belonging to a corresponding LD module group Gi is 4. Thus, the total number m×n of the LD modules LDM1 to LDM4 is 16.

The following Table 1 shows, as an example, a relationship between the set value of laser output power of the fiber laser (hereinafter, also referred to as the "laser output power"), and the number of LD modules to be supplied with the driving current (hereinafter, also referred to as the "number of driven LDMs") among the LD modules LDM1 to LDM4.

TABLE 1

| Laser output power [kW] | Number of driven LDMs |
|---|---|
| 1.09 or less | 4 (1 system) |
| 1.1 or more and 2.09 or less | 8 (2 systems) |
| 2.1 or more and 3.09 or less | 12 (3 systems) |
| 3.1 or more | 16 (4 systems) |

According to the example shown in Table 1, when the laser output power is 1.09 kW or less, the control section 14 sets the number of driven LDMs to 4, and selects LD modules LDM1, which correspond to 1 system, as the LD modules to be supplied with the driving current. When the laser output power is 1.1 kW or more and 2.09 kW or less, the control section 14 sets the number of driven LDMs to 8, and selects LD modules LDM1 and LDM2, which correspond to 2 systems, as the LD modules to be supplied with the driving current. When the laser output power is 2.1 kW or more and 3.09 kW or less, the control section 14 sets the number of driven LDMs to 12, and selects LD modules LDM1 to LDM3, which correspond to 3 systems, as the LD modules to be supplied with the driving current. When the laser output power is 3.1 kW or more, the control section 14 sets the number of driven LDMs to 16, and selects LD modules LDM1 to LDM4, which correspond to 4 systems, as the LD modules to be supplied with the driving current.

The following Table 2 shows states of the fiber laser when the laser output power is 0.5 kW, 1.0 kW, 1.5 kW, 2.0 kW, 2.5 kW, 3.0 kW, 3.5 kW, or 4.0 kW. Table 2 shows, as the states of the fiber laser, specifically, (1) a percentage of laser output power to the maximum output (hereinafter, also referred to as an "output ratio"), (2) the total output power of the LD module group 2 (hereinafter, also referred to as a "pumping output power"), (3) the number of systems of LD modules to be supplied with the driving current (hereinafter, also referred to as the "number of driven LDM systems"), (4) the number of LD modules to be supplied with the driving current (hereinafter, also referred to as the "number of driven LDMs"), and (5) the value of the driving current to be supplied to each of the LD modules (hereinafter, also referred to as the "driving current").

TABLE 2

| Laser output power [kW] | Output ratio [%] | Pumping output power [kW] | Number of driven LDM systems | Number of driven LDMs | Value of driving current [A] |
|---|---|---|---|---|---|
| 0.5 | 12.5 | 0.7 | 1 | 4 | 8.0 |
| 1.0 | 25.0 | 1.4 | 1 | 4 | 16.0 |
| 1.5 | 37.5 | 2.1 | 2 | 8 | 12.0 |
| 2.0 | 50.0 | 2.8 | 2 | 8 | 16.0 |
| 2.5 | 62.5 | 3.5 | 3 | 12 | 13.3 |
| 3.0 | 75.0 | 4.2 | 3 | 12 | 16.0 |
| 3.5 | 87.5 | 4.9 | 4 | 16 | 14.0 |
| 4.0 | 100.0 | 5.6 | 4 | 16 | 16.0 |

For example, consider a case in which the laser output power is 0.5 kW. If all of the LD modules LDM1 to LDM4 are driven, a driving current of 2.0 A is supplied to each of the LD modules LDM1 to LDM4. On the other hand, if the control device 1 limits the driven LD modules to 1 system of LD modules, that is, 4 LD modules LDM1, a driving current of 8.0 A is supplied to each of the driven LD modules. Thus, in this case, as compared to a case in which all of the LD modules LDM1 to LDM4 are driven, it is possible to reduce an amount of shift that occurs in oscillation wavelength due to a reduced amount of the driving current supplied to each LD module. Alternatively, consider a case in which the laser output power is 1.0 kW. If all of the LD modules LDM1 to LDM4 are driven, a driving current of 4.0 A is supplied to each of the LD modules LDM1 to LDM4. On the other hand, if the control device 1 limits the driven LD modules to 1 system of LD modules, that is, 4 LD modules LDM1, a driving current of 16.0 A is supplied to each of the driven LD modules. Thus, in this case, as compared to the case in which all of the LD modules LDM1 to LDM4 are driven, it is possible to reduce an amount of shift that occurs in oscillation wavelength due to a reduced amount of the driving current supplied to each LD module. The same applies to respective cases of laser output powers of 1.5 kW, 2.0 kW, 2.5 kW, and 3.0 kW.

It should be noted that in a case in which the fiber laser has an Yb-doped fiber as an amplifying medium, the number of driven LDMs for each laser output power may be set so that the oscillation wavelength of each of the driven LD modules is within a wavelength band of 960 nm or more and 968 nm or less for any settable output value of the fiber laser. This is because in the wavelength band, the wavelength dependence of the amount of pumping light to be absorbed into Yb is lower than that in other wavelength bands. Further, in this wavelength band, the amount of pumping light to be absorbed into Yb increases as the wavelength increases, and the amount of pumping light to be absorbed into Yb increases as the temperature increases. According to the former property, the amount of pumping light to be absorbed into Yb increases in a longer wavelength region, in which the pumping light has a greater power. Thus, it is possible to reduce residual pumping light. This results in reduction in deterioration or damage of optical components that might be caused by residual pumping light. Further, according to the latter property, the amount of pumping light to be absorbed into Yb increases because of heat generated during laser oscillation. Thus, it is possible to have a shorter fiber length of the Yb-doped fiber. This results in reduction in occurrence of photodarkening and induced Raman scattering.

(Variation of Control Device)

Figure 2:
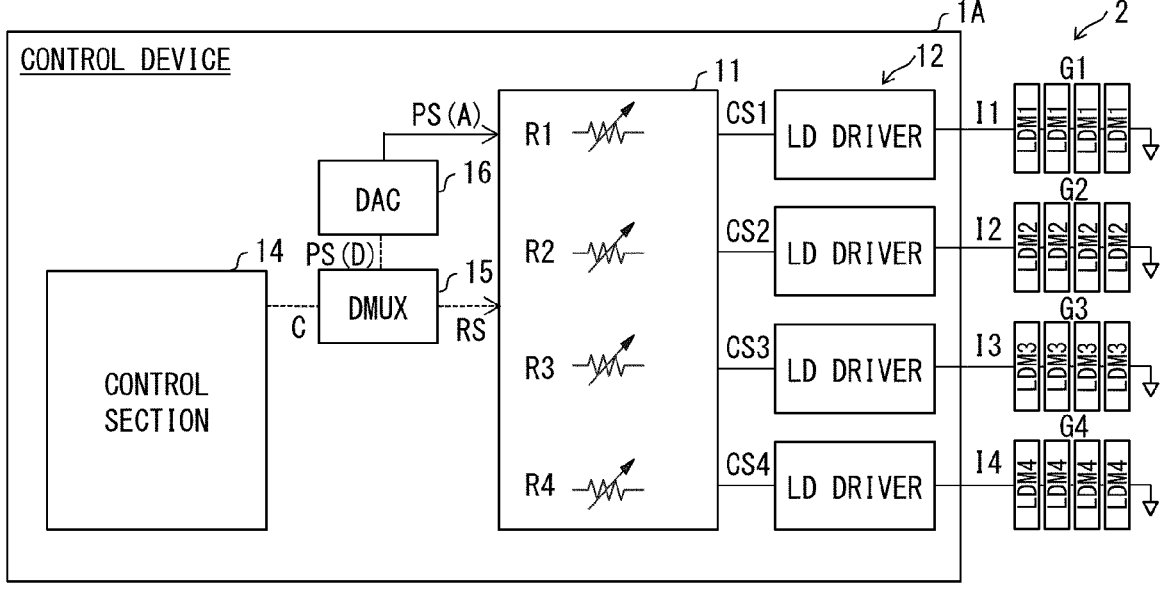
FIG. 2 is a block diagram illustrating a variation of the control device illustrated in FIG. 1.

The following description will describe a variation of the control device 1, with reference to FIG. 2. FIG. 2 is a block diagram illustrating a configuration of the control device 1 in accordance with the present variation (hereinafter, referred to as a "control device 1A"). In FIG. 2, paths for analog signals are indicated by solid lines, and paths for digital signals are indicated by broken lines.

The control device 1A includes a demultiplexer 15 and a DA (digital-to-analog) converter 16, in addition to the digital potentiometer 11, the LD driver group 12, and the control section 14 which are described above. The AD converter 13 is eliminated in the control device 1A.

In the present variation, the control section 1A is notified of the set value of laser output power of the fiber laser via communication (e.g., serial communication). The control section 14 outputs a control signal C, which includes an output setting signal PS(D) and a resistance setting signal RS. As has been discussed, the output setting signal PS(D) is a digital signal that indicates a set value of laser output power of the fiber laser, and the resistance setting signal RS is a digital signal that specifies a resistance value of each of the variable resistors R1 to Rn.

The demultiplexer 15 is configured to divide, into the output setting signal PS(D) and the resistance setting signal RS, the control signal C obtained from the control section 14. The output setting signal PS(D) is supplied to the DA converter 16, and the resistance setting signal RS is supplied to the digital potentiometer 11. The DA converter 16 is configured to convert, into an output setting signal PS(A), which is an analog signal, the output setting signal PS(D) obtained from the demultiplexer 15. The output setting signal PS(A) is supplied to the digital potentiometer 11.

Operations of the control section 14 and the digital potentiometer 11 of the control device 1A are the same as those of the control section 14 and the digital potentiometer 11 of the control device 1. Thus, the control device 1A also achieves advantageous effects similar to those of the control device 1.

It should be noted that the control device 1A may further include an AD converter 13 as in the control device 1. This makes it possible to achieve advantageous effects similar to those of the control device 1 in each of a case in which the set value of laser output power of the fiber laser is notified via communication and a case in which the set value of laser output power of the fiber laser is inputted as an analog signal.

(Configuration of Fiber Laser)

Figure 3:
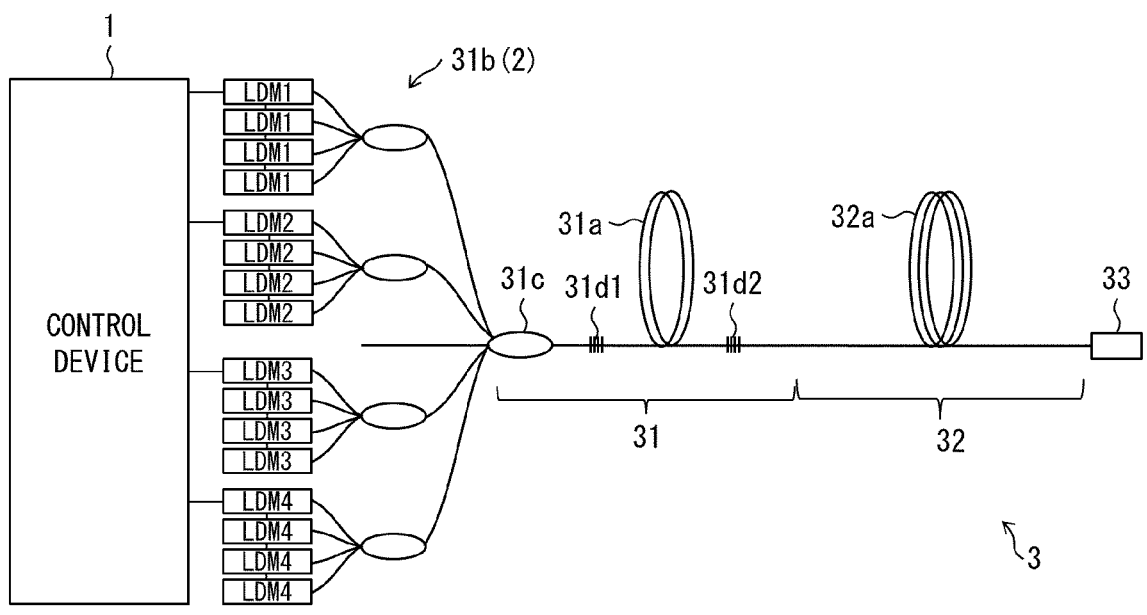
FIG. 3 is a block diagram illustrating a configuration of a fiber laser device including the control device illustrated in FIG. 1.

The following description will describe a configuration of a fiber laser device 3 including the control device 1, with reference to FIG. 3. FIG. 3 is a block diagram illustrating a configuration of the fiber laser device 3.

The fiber laser device 3 is a master oscillator power amplifier (MOPA) fiber laser for processing, and includes a master oscillator (MO) section 31, a power amplifier (PA) section 32 that amplifies a laser beam generated in the MO section 31, and a processing head 33, in addition to the control device 1. It should be noted that the processing head 33 may be replaced depending on use application, or may be eliminated. It should be also noted that the fiber laser device 3 may include the control device 1A instead of the control device 1.

In one or more embodiments, a forward-pumping fiber laser is employed as the MO section 31. The MO section 31 may be constituted by an optical fiber 31*a*, a pumping light source unit 31*b*, a combiner 31*c*, and a pair of fiber Bragg gratings (FBGs) 31*d*1, 31*d*2.

The optical fiber 31*a* is an optical fiber (e.g., double cladding fiber) that has a core doped with a rare earth element. The rare earth element with which the core of the optical fiber 31*a* is doped is not particularly limited. In one or more embodiments, the rare earth element is Yb. One end of the optical fiber 31*a* is connected to the FBG 31*d*1 that functions as a mirror, and the other end of the optical fiber 31*a* is connected to the FBG 31*d*2 that functions as a half mirror. This causes the optical fiber 31*a* to function as a resonator that recursively amplifies a laser beam emitted from the rare earth element which is pumped.

The pumping light source unit 31*b* is configured to generate pumping light (forward-pumping light) for pumping the rare earth element with which the core of the optical fiber 31*a* is doped. According to one or more embodiments, the abovementioned LD module group 2 is employed as the pumping light source unit 31*b*. The combiner 31*c* introduces, into an inner cladding of the optical fiber 31*a*, the pumping light generated in the pumping light source unit 31*b*.

Further, one or more embodiments employ a fiber amplifier as the PA section 32. The PA section 32 may be constituted by an optical fiber 32*a*.

The optical fiber 32*a* is an optical fiber (e.g., double cladding fiber) that includes a core doped with a rare earth element. The rare earth element with which the core of the optical fiber 32*a* is doped is not particularly limited. In one or more embodiments, the rare earth element is Yb. One end of the optical fiber 32*a* is connected to the FBG 31*d*2 of the MO section 31. This causes the optical fiber 32*a* to function as an amplifier that amplifies a laser beam generated by the MO section 31. Further, the other end of the optical fiber 32*a* is connected to the processing head 33. This allows a workpiece to be irradiated, through the processing head 33, with the laser beam amplified by the optical fiber 32*a*.

The control device 1 decides, in accordance with the set value of laser output power of the fiber laser device 3, the number of LD modules to be supplied with the driving current among the LD modules LDM1 to LDMn constituting the pumping light source unit 31*b*. Accordingly, the number of the LD modules to be supplied with the driving current can be smaller in a case in which the set value is lower. This consequently allows a greater driving current to be supplied to each of the LD modules that have been selected, as compared to a case in which the driving current is to be supplied to all of the LD modules LDM1 to LDMn. Thus, it is possible to reduce an amount of shift that occurs in the oscillation wavelength when the amount of the driving current supplied to each of the LD modules is too small. This allows a laser beam supplied from the pumping light source unit 31*b* to be efficiently absorbed into the rare earth element with which the optical fiber 31*a* is doped. It is thus possible to reduce residual pumping light. This results in reduction in deterioration or damage of optical components. In addition, it is possible to achieve a shorter fiber length of the optical fiber 31*a*. This results in reduction in occurrence of photo-darkening and induced Raman scattering.

One or more embodiments of the present invention can also be expressed as follows:

A control device in accordance with one or more embodiments of the present invention is a control device for controlling at least two laser diode (LD) modules each supplying pumping light to a variable-output fiber laser, the control device including a control section configured to set, in accordance with a set value of laser output power of the fiber laser, the number of LD modules to be supplied with a driving current among the at least two LD modules.

With this configuration, it is possible to reduce, by use of an alternative method to a method in which a wavelength stabilizing element is used, an amount of shift that occurs in oscillation wavelength of each of the LD modules due to a change in laser output power.

A control device in accordance with one or more embodiments of the present invention employs, in addition to the configuration of the embodiments described above, a configuration in which the control section sets the number of LD modules to be supplied with the driving current such that in a case in which the set value is lower, the number is smaller.

With this configuration, it is possible to reduce an amount of shift that occurs in oscillation wavelength of each of the LD modules due to a change in laser output power.

A control device in accordance with one or more embodiments of the present invention employs, in addition to the configuration of the embodiments described above, a configuration in which the control device further includes a digital potentiometer configured to: include at least two variable resistors each configured to convert an output setting signal to a current setting signal, the output setting signal being an analog signal indicating the set value, the current setting signal being an analog signal indicating a value of the driving current to be supplied to each of the LD modules; and set a resistance value of each of the variable resistors in accordance with a resistance setting signal that is a digital signal outputted from the control section.

With this configuration, it is possible to reduce, with use of a simple configuration, an amount of shift that occurs in oscillation wavelength of each of the LD modules due to a change in laser output power.

A control device in accordance with one or more embodiments of the present invention employs, in addition to the configuration of the embodiments described above, a configuration in which the control device further includes an AD converter configured to convert the output setting signal which is an analog signal to an output setting signal which is a digital signal to be supplied to the control section.

With this configuration, in a case in which the set value of the laser output power is supplied to the control device by means of an analog signal, it is possible to reduce, with use of a simple configuration, an amount of shift that occurs in oscillation wavelength of each of the LD modules due to a change in laser output power.

A control device in accordance with one or more embodiments of the present invention employs, in addition to the configuration of the embodiments described above, a configuration in which the control device further includes: a demultiplexer configured to divide a control signal into an output setting signal and the resistance setting signal, the control signal being a digital signal outputted from the control section, the output setting signal being a digital signal indicating the set value, the resistance setting signal being a digital signal to be supplied to the digital potentiometer; and a DA converter configured to convert the output setting signal to the output setting signal which is an analog signal to be supplied to the digital potentiometer, the output setting signal being a digital signal outputted from the demultiplexer.

With this configuration, in a case in which the set value of the laser output power is notified to the control device via communication, it is possible to reduce, with a simple configuration, an amount of shift that occurs in oscillation wavelength of each of the LD modules due to a change in laser output power.

A control device in accordance with one or more embodiments of the present invention employs, in addition to the configuration of the embodiments described above, a configuration in which the control section decides the number of LD modules to be supplied with the driving current so that an oscillation wavelength of each of the LD modules is within a wavelength band of 960 nm or more and 968 nm or less for any settable laser output power of the fiber laser.

With this configuration, in a case in which an amplifying medium of the fiber laser is an Yb-doped fiber, it is possible to efficiently reduce an amount of shift that occurs in oscillation wavelength of each of the LD modules due to a change in laser output power.

A control method in accordance with one or more embodiments of the present invention is a control method for controlling at least two laser diode (LD) modules each supplying pumping light to a variable-output fiber laser, the method including a controlling step in which the number of LD modules to be supplied with a driving current among the at least two LD modules is set in accordance with a set value of output power of the fiber laser.

With this configuration, it is possible to reduce, by use of an alternative method to a method in which a wavelength stabilizing element is used, an amount of shift that occurs in oscillation wavelength of each of the LD modules due to a change in laser output power.

The fiber laser device in accordance with one or more embodiments of the present invention includes the control device in accordance with the embodiments described above.

With this configuration, it is possible to reduce an amount of shift that occurs in oscillation wavelength of each of the LD modules due to a change in laser output power. Therefore, it is possible to efficiently use pumping light outputted from the at least two LD modules.

As used herein, the phrase "by use of an alternative method to a method in which a wavelength stabilizing element is used" does not mean that no wavelength stabilizing element is used. Thus, the scope of the present invention also encompasses one or more embodiments in which an LD module includes a wavelength stabilizing element.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Control device
11 Digital potentiometer
12 LD driver group
13 AD converter
14 Control section
15 Demultiplexer
16 DA converter
2 LD module group
3 Fiber laser device

What is claimed is:

1. A control device for controlling two or more laser diode (LD) modules each supplying pumping light to a variable-output fiber laser, the control device comprising:
    a controller that sets, in accordance with a set value of laser output power of the variable-output fiber laser, a number of LD modules to which a driving current is supplied among the two or more LD modules; and
    a digital potentiometer comprising two or more variable resistors each configured to convert an analog output setting signal to a current setting signal, wherein
    the analog output setting signal indicates the set value,
    the current setting signal is an analog signal indicating a value of the driving current to be supplied to each of the LD modules to which the driving current is supplied, and
    the digital potentiometer is configured to set a resistance value of each of the variable resistors in accordance with a resistance setting signal that is a digital signal outputted from the controller.

2. The control device according to claim 1, wherein the controller sets the number to be smaller as the set value gets lower.

3. The control device according to claim 1, further comprising:
    an analog-to-digital converter configured to convert the analog output setting signal to a digital output setting signal that is supplied to the controller.

4. The control device according to claim 1, further comprising:
    a demultiplexer configured to divide a digital control signal into a digital output setting signal and the resistance setting signal, wherein
    the digital control signal is outputted from the controller,
    the digital output setting signal being a digital signal indicating the set value, and
    the resistance setting signal is supplied to the digital potentiometer; and
    a digital-to-analog converter configured to convert the digital output setting signal to the analog output setting signal, wherein
    the analog output setting signal is supplied to the digital potentiometer, and
    the digital output setting signal is outputted from the demultiplexer.

5. The control device according to claim 1, wherein the controller decides the number of LD modules to which the driving current is supplied such that an oscillation wavelength of each of the LD modules to which the driving current is supplied is within a wavelength band of 960 nm or more and 968 nm or less for any settable laser output power of the fiber laser.

6. A fiber laser device comprising:

the control device according to claim 1.

7. A control method for controlling two or more laser diode (LD) modules each supplying pumping light to a variable-output fiber laser with a control device comprising a potentiometer that comprises two or more variable resistors each configured to convert an analog output setting signal indicating a set value of output power of the fiber laser to an analog current setting signal indicating a value of a driving current to be supplied to each of the LD modules, the method comprising:

setting a number of LD modules to which a driving current is supplied among the two or more LD modules in accordance with the set value;

generating a digital resistance setting signal in accordance with the set number of LD modules; and setting a resistance value of each of the two or more variable resistors in accordance with the resistance setting signal.

* * * * *